May 19, 1931.  L. W. PARDEE  1,806,177
SUCTION CLEANER
Filed April 7, 1928   2 Sheets-Sheet 1
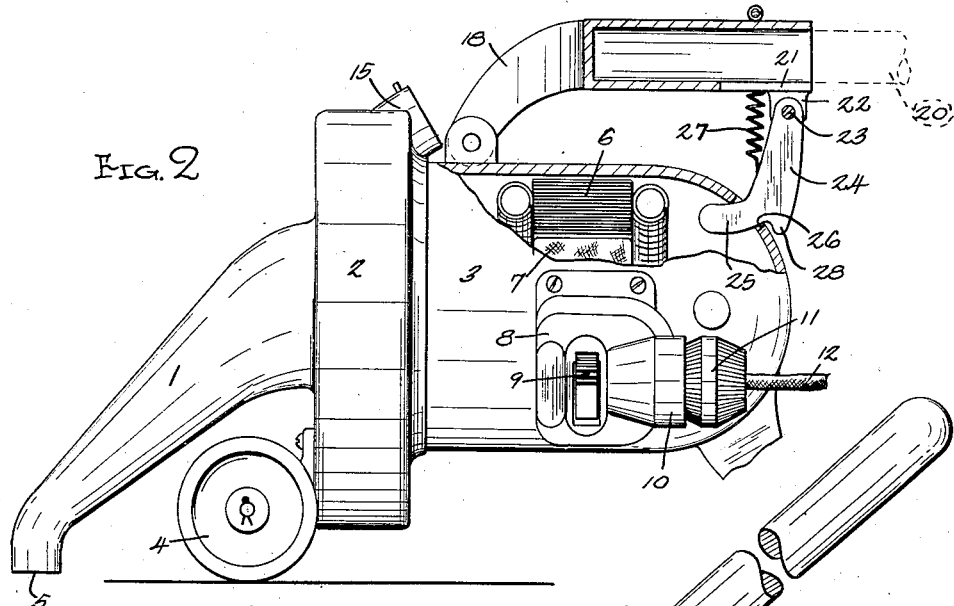
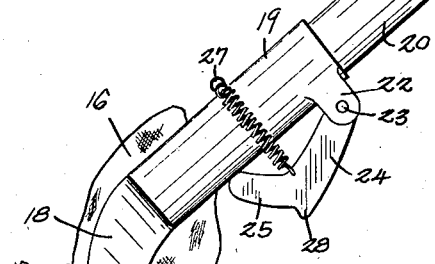
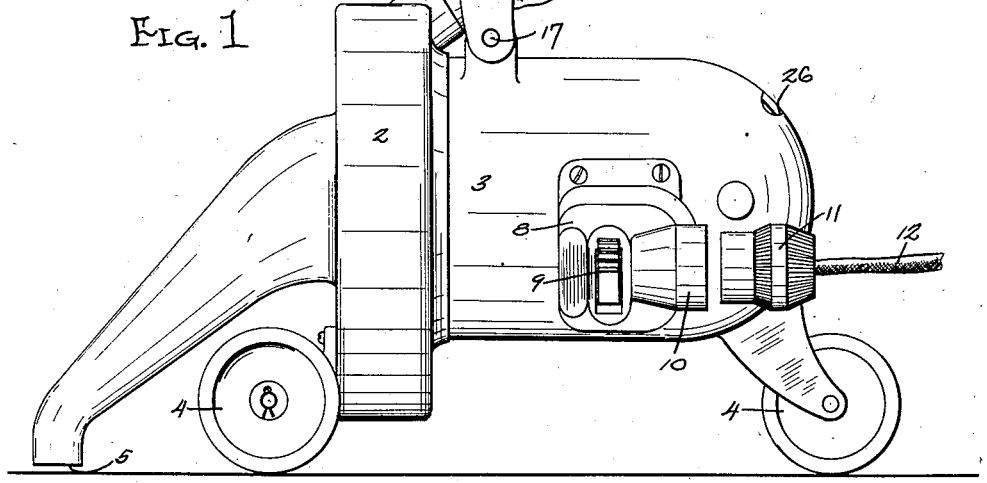
LLOYD W. PARDEE
INVENTOR
By Smith and Freeman
ATTORNEYS

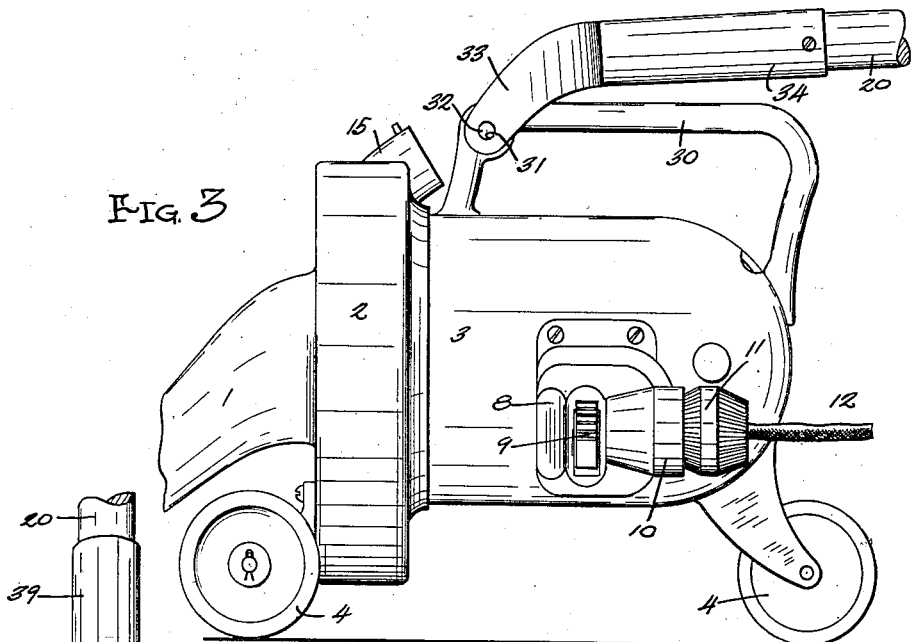
Fig. 3
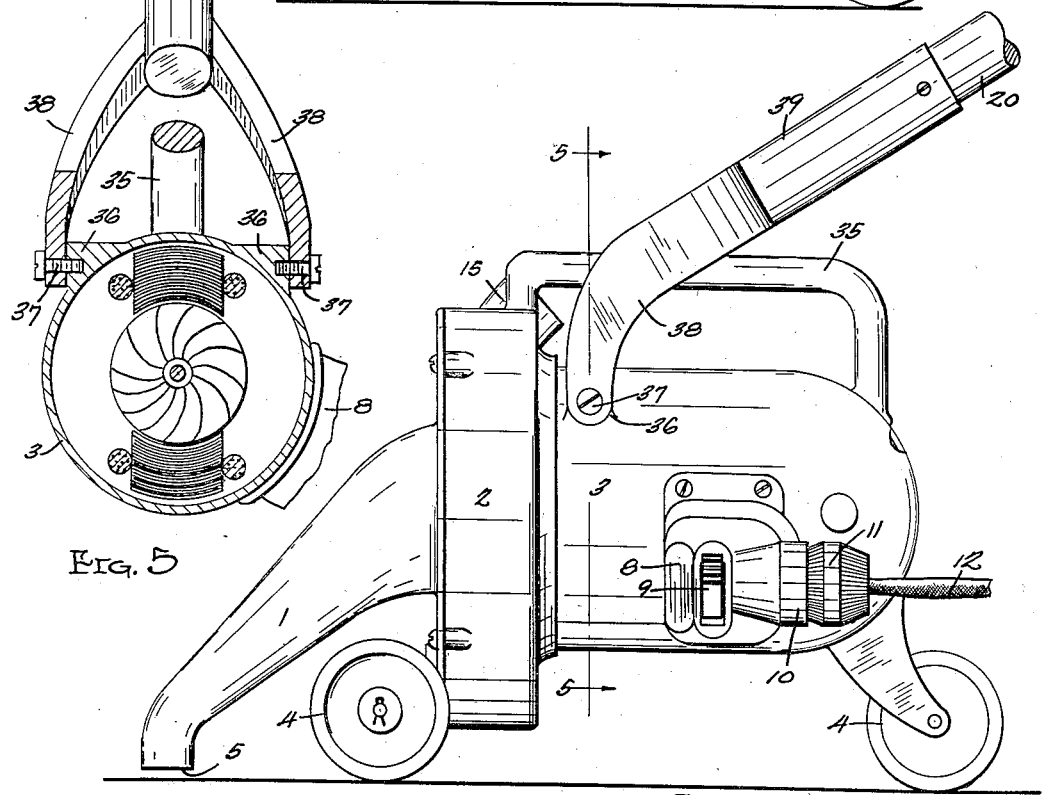
Fig. 5
Fig. 4
Lloyd W. Pardee
INVENTOR
By Smith and Freeman
ATTORNEYS Patented May 19, 1931

1,806,177

UNITED STATES PATENT OFFICE

LLOYD W. PARDEE, OF LAKEWOOD, OHIO, ASSIGNOR TO THE SCOTT AND FETZER COMPANY, OF CLEVELAND, OHIO, A CORPORATION OF OHIO

SUCTION CLEANER

Application filed April 7, 1928. Serial No. 268,144.

This invention relates to electric suction cleaners of the portable type and has for its object the provision of a cleaner which can be expeditiously converted from a floor cleaner to a stair and upholstery cleaner with a minimum of effort; the provision of a cleaner having both a short handle and a long handle applicable thereto with a minimum delay and without the necessity of removing the short handle when the long handle is removed; the provision of a cleaner having a short handle ready for instant use when the long handle is removed; the provision of a short handle pivoted to the cleaner and means for either fastening said short handle to the casing or to the long handle; while other objects and advantages of the invention will become apparent as the description proceeds.

In the drawings accompanying and forming a part of this application Fig. 1 is a side elevation of a suction cleaner showing a long handle connected therewith; Fig. 2 shows the same cleaner partly in section, the long handle having been removed and its socket portion rigidly secured to the cleaner casing to constitute a short handle; Figs. 3 and 4 are side elevations of modified forms of cleaner; and Fig. 5 is a cross sectional view of the cleaner shown in Fig. 4.

The casing of such cleaner comprises a collecting nozzle 1, fan housing 2, and motor housing 3 secured rigidly together in the order named, the nozzle having an inlet mouth at 5 whose plane is substantially parallel to the motor axis. For floor use, said casing is provided with suitable floor wheels 4—4 whereby the casing is supported with its inlet mouth 5 in proper working relation with the supporting surface. Located inside the motor housing 3 are the field elements 6 and rotating armature 7 of an electric motor, while carried by said housing is a switch casing 8 having therein an electric switch of any suitable type, operatively connected to the motor and operated by a projecting handle 9. Also preferably but not necessarily combined therewith is a separable electric connection comprising a receiving portion 10 rigid with the switch housing, and a removable entering portion 11 secured to the end of the flexible electric cord 12. Carried by the fan housing 2 at one side is an outlet neck 15 to which is attached the dust bag 16; and pivoted to the casing on a horizontal transverse pivot pin 17 is a handle arm 18 having integral therewith an elongated hollow socket member 19 adapted to receive and detachably hold the end of an elongated handle 20 by which the cleaner is manipulated about the floor. Said socket is preferably split at one point as shown at 21 and provided with spaced lugs 22 and a clamping screw 23; and in Figs. 1 and 2 I have shown said clamping screw as provided, between said lugs, with a depending pivoted hook member 24 having a point 25 adapted to enter a hole 26 formed in the motor housing to lock said socket member rigidly to the casing. I have also shown said hook as provided with a coil spring 27 embracing said socket member and fastened to the hook in such wise as to tend to hold said hook in position in the aperture 26; and I have also shown said hook member as formed with a projection 28 adapted to limit the insertion of the hook in said aperture.

In the absence of the extension handle 20 the casing is thus provided with a handle-device having a hand-grip portion which may be secured rigidly to the casing, parallel to the axis of the motor, and above the center of gravity of the casing, so that the cleaner can be picked up and used for furniture, stairs, and the like independently of the wheels; or the extension handle can be attached to a part of this first handle-device to allow the cleaner to be manipulated about the floor in the customary manner.

In the form of the invention shown in Fig. 3 I have shown the exterior of the motor-housing as provided with a sad-iron type of handle 30 rigidly secured thereto at each end but formed at its forward end with a transverse aperture 31 adapted to receive a pivot pin 32 whereby the yoke 33 of a removable socket member 34 can be detachably secured in place without removing the handle 30. In this last form the long handle 20 is permanently secured in the socket member 34.

In the form of the invention shown in Fig. 4 the casing is formed with a short handle 35 of sad iron type rigidly secured to the top thereof; and the sides of the motor housing are formed with cheeks 36 and pivots 37 for the reception of the fork arms 38 carried by the socket member 39 to which is secured the long handle 20. In this case the fork arms are made of sufficient length to swing over the short-handle 35 while in Fig. 3 the arms 33 are so bent as to dispense with this necessity.

It will therefore be seen that many changes in point of design and detail construction can be made within the scope of my invention and I do not limit myself except as specifically recited in my several claims.

Having thus described my invention what I claim is:

1. In a suction cleaner, a casing having a fan chamber, and a collecting nozzle, a handle device having its forward end pivoted to said casing upon a horizontal axis, the exterior of said handle device having a hand-grip portion and a part of said handle device being hollow for the reception of an extension handle, and means for detachably securing a part of said handle-device to the cleaner casing in rigid relation.

2. In a suction cleaner, a casing having a collecting-nozzle, a fan chamber and an electric motor arranged in the order named from front to rear, wheels for supporting said casing with the motor axis substantially horizontal, a handle device having one end pivoted to the upper part of said casing upon a horizontal axis, means additional to the pivot for securing said handle device in rigid relation to the casing, an extension handle adapted to engage a part of said first handle device, and means for securing said extension handle to said first handle device, said first handle-device also having a part which in the absence of said extension-handle is located above the center of gravity of the casing to constitute a pick-up handle.

3. In a suction cleaner, a casing having a fan chamber, a collecting nozzle and a motor housing arranged in the order named from front to rear, a motor in said housing, wheels for suporting said casing with its motor axis substantially horizontal, a handle device carried by said casing and having a hand grip portion above the center of gravity of said casing, an extension handle, and means for securing said extension handle to a part of said first handle device.

4. In a suction cleaner, a casing comprising a fan chamber, a collecting nozzle and a motor housing, wheels to support said casing with its axis substantially horizontal, a handle device carried by said casing and having a hand grip closely adjacent to said casing and approximately above the center of gravity thereof, an extension handle, means for securing said extension handle to a part of said first handle-device, that part of said first handle device to which said extension handle is so secured being pivotally movable relative to an axis which is parallel to the axis of said wheels, and means for securing said first handle-device against pivotal movement.

5. In an electric suction cleaner, a casing comprising a collecting-nozzle and a fan-chamber and a motor-housing arranged in the order named from front to rear, said nozzle having an inlet-mouth whose plane is substantially parallel to the motor axis, a handle-device carried by said casing and having a hand-grip located approximately above the center of gravity of said casing, an extension-handle, means for securing said extension-handle to a part of said first handle-device and means for fixedly securing said handle-device to said casing with said grip substantially parallel to the motor axis.

6. In a portable electric cleaner, a rigid casing comprising a nozzle and a fan-chamber and a motor housing arranged in the order named from front to rear, said nozzle having an inlet mouth whose plane is substantially parallel to the motor axis, a handle fork pivoted to said casing upon a transverse axis, said handle fork having a socket member adapted to receive an extension handle, and pick-up means for supporting said casing directly above its center of gravity, said pick-up means including said handle fork and also including means whereby said handle fork may be fixedly secured substantially parallel to the motor axis.

In testimony whereof I hereunto affix my signature.

LLOYD W. PARDEE.